United States Patent [19]

Dey

[11] 4,112,993

[45] Sep. 12, 1978

[54] GROMMET ASSEMBLY

[75] Inventor: Ervin J. Dey, Santa Fe Springs, Calif.

[73] Assignee: SPS Technologies, Inc., Jenkintown, Pa.

[21] Appl. No.: 791,090

[22] Filed: Apr. 26, 1977

[51] Int. Cl.² .............................................. F16B 19/08
[52] U.S. Cl. .................................... 151/41.74; 85/39; 85/70; 24/95
[58] Field of Search ............... 85/38, 39, 4, 70, 73, 85/74; 151/41.74; 24/216, 144, 95

[56] References Cited

U.S. PATENT DOCUMENTS

| | | | |
|---|---|---|---|
| 2,700,172 | 1/1955 | Rohe | 85/39 |
| 3,464,310 | 9/1969 | Lambert | 85/39 |
| 3,496,628 | 2/1970 | Davis | 85/70 |
| 3,678,535 | 7/1972 | Charles | 85/73 |
| 3,771,410 | 11/1973 | Swindt | 85/4 |
| 3,948,142 | 4/1976 | McKay et al. | 85/70 |

Primary Examiner—Marion Parsons, Jr.
Attorney, Agent, or Firm—Aaron Nerenberg

[57] ABSTRACT

A two piece grommet assembly comprising an inner and an outer member wherein each member has an enlarged head at one end formed to bear upon opposite sides of a panel skin. The outer member has a recessed area intermediate its ends and the inner member has a weakened section on the shank portion which is adapted to deform into the recessed section of the outer member upon the application of opposing axial force on the two members. The weakened section of the inner member is comprised of a reduced cross-sectional thickness portion which collapses upon the application of axial force, causing the reduced thickness portion to flow inwardly into intimate contact with the recess in the outer member, locking the members together in the panel skin.

6 Claims, 3 Drawing Figures

GROMMET ASSEMBLY

BACKGROUND OF THE INVENTION

This invention relates to grommet assemblies and more particularly to a two piece grommet assembly which is installed by the application of opposed axial force to lock the assembly together within a panel skin.

In the aerospace industry it is often desirable to attach various kinds of fasteners to a panel skin. In some instances, particularly when using advanced composite materials, certain kinds of fasteners cannot be directly placed in a hole formed in the material. In the case of composite materials, there is very low bearing strength and a tendency for the material to wear excessively around the perimeter of the hole because of the fibrous nature of the material. Corrosion caused by many standard fastener materials is another problem with the use of composite materials. Only certain metals such as titanium and MP35, a nickel based steel alloy, are compatible with many of the composite materials presently being used. Consequently, isolation between the perimeter of the composite material and the fastener material must be maintained. By using grommets made of selected materials, fasteners made from any material can be effectively used in composite panel skin materials.

Another problem encountered in any panel skin material is deformation of fastener holes due to stresses encountered over prolonged periods. Generally, these holes must be redrilled and oversized fasteners must be installed. It is sometimes not feasible for various reasons to use different size fasteners than the size originally used. Grommets constructed in accordance with the present invention will solve this problem as well.

SUMMARY OF THE INVENTION

It is therefore an object of the present invention to provide a novel grommet assembly for insertion into holes in panel skin materials. It is a further object to provide a grommet assembly for use with advanced composite materials. It is yet another object to provide a grommet assembly for insertion into holes in panel skins wherein the grommet assembly provides support for the panel skin material on the periphery of the holes. It is yet a further object to provide a grommet assembly for eliminating corrosion between certain panel skin and fastener materials. It is still another object to reduce localized bearing stress on the periphery of holes in panel skins caused by insertion of fasteners therein.

These and other objects are accomplished according to the present invention by a two piece grommet assembly including first and second members, each member having an enlarged head formed to bear upon the respective opposite surfaces of a panel skin and having an opening therethrough. The first member includes a shank portion extending in an axial direction from the head, the shank portion having a first cross-sectional area substantially equal to the cross-sectional area of an opening in the panel skin, a second cross-sectional area smaller than the first area and a recess formed between the first and second areas. The second member includes a shank portion extending in an axial direction from the head toward the first member, the shank portion having a substantially constant thickness annular wall along its entire length with a section of varying thickness intermediate the ends thereof. The cross-sectional area of the second member shank portion is substantially equal to the cross-sectional area of the panel skin opening, and the cross-sectional dimension between the inside surface of the shank portion walls is greater than the second cross-sectional area of the first member. The varying thickness portion of the second member deforms and flows into engagement with the recess in the first member upon application of opposing axial forces on the first and second members toward each other.

Other objects and features of the present invention will be readily apparent to those skilled in the art from the following specification and appended drawings wherein is illustrated a preferred form of the invention.

DESCRIPTION OF THE PREFERRED EMBODIMENT

Figure 1:
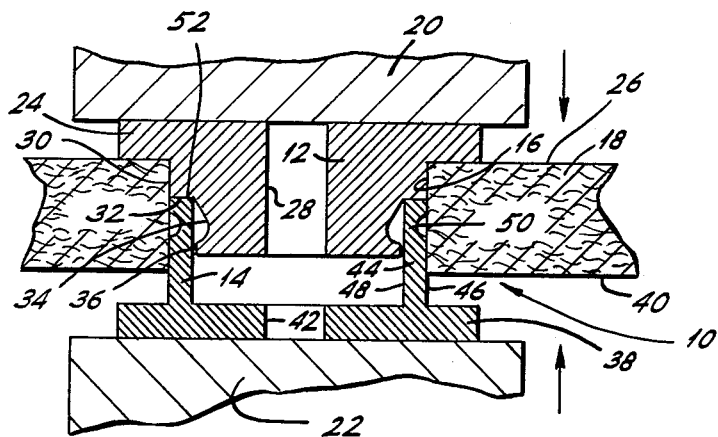
FIG. 1 is a side elevation view in cross-section of a two-piece grommet assembly prior to installation in a panel skin, in accordance with the present invention.

In accordance with a preferred embodiment of the present invention, FIG. 1 shows a two piece grommet assembly 10 including a first member 12 and a second member 14. Both members are designed to fit into an opening 16 in a workpiece 18 from opposite sides. The workpiece material may typically be an advanced composite material such as, for example, graphite-epoxy, boron-epoxy, boron-aluminum, glass-epoxy or Kelvar 49-epoxy. It should be understood, however, that the present invention is capable of being installed in any other standard workpiece materials such as metals like aluminum, titanium or steel, or non-metals like fiberglass resins, to mention a few. The two members 12 and 14 are locked together to form the grommet assembly which remains permanently installed in the workpiece hole by applying opposed axial forces on each member, such as, for example, by means of anvils 20 and 22 of a conventional clamping tool (not shown).

The construction of members 12 and 14 will now be described in greater detail. First member 12, which may be descibed as the receptacle member, has an enlarged head 24 with a greater diameter than the diameter of workpiece opening 16 and is adapted to bear on a surface 26 of the workpiece. Although a flat head is shown on the first and second members for illustrative purposes, it should be understood that any of a number of conventional head styles could be used instead, while still remaining within the scope of the present invention. One style of head which might typically be used is a countersunk flat head which, when the two members are fully assembled, is flush with both surfaces of the workpiece. Member 12 includes an axial bore 28 with a diameter less than the diameter of opening 16. Bore 28 is intended to have an elongated fastener of some type inserted therethrough. A shank portion 30 extends axially inward a relatively short distance from head 24 and is formed with a diameter approximately equal to the diameter of opening 16 in the workpiece. It should be noted that especially when the grommet assembly is used in composite workpiece materials, the fit between the two members 12 and 14 and opening 16 should be as tight as possible while still allowing axial movement therebetween. Such a relative tight fit provides support for the composite material walls surrounding the opening, a highly desirable feature for these kinds of materials. Member 12 further includes a shoulder 32, which extends generally radially inwardly from the surface of shank 30, and a generally curved recess 34 which is located axially below and extends radially inwardly from shoulder 32. Recess 34 terminates in a tip portion 36 which has a diameter greater than the smallest diameter of recess 34, thus forming a generally concave section at recess 34 into which material from member 14 is forced during assembly, as will be more fully described hereinafter.

Member 14 has an enlarged head 38 with a diameter greater than the diameter of workpiece opening 16, adapted to bear on the other surface 40 of the workpiece. An axial bore 42 is included through enlarged head 38 and is designed to be aligned with bore 28 when the grommet is fully assembled. A shank portion 44 extends axially inwardly from head 38 and has an outside surface 46 with a diameter substantially equal to shank portion 30 and opening 16, and an inside surface 48 with a diameter just slightly greater than the diameter of tip portion 36 to allow relative movement therebetween. Shank portion 44 further includes a section 50 of variable cross-sectional area which is generally in initial radial alignment with recess 34. Section 50 is designed to collapse and deform radially inwardly into recess 34 during assembly. Shank portion 44 terminates in an end surface 52.

Figure 2:
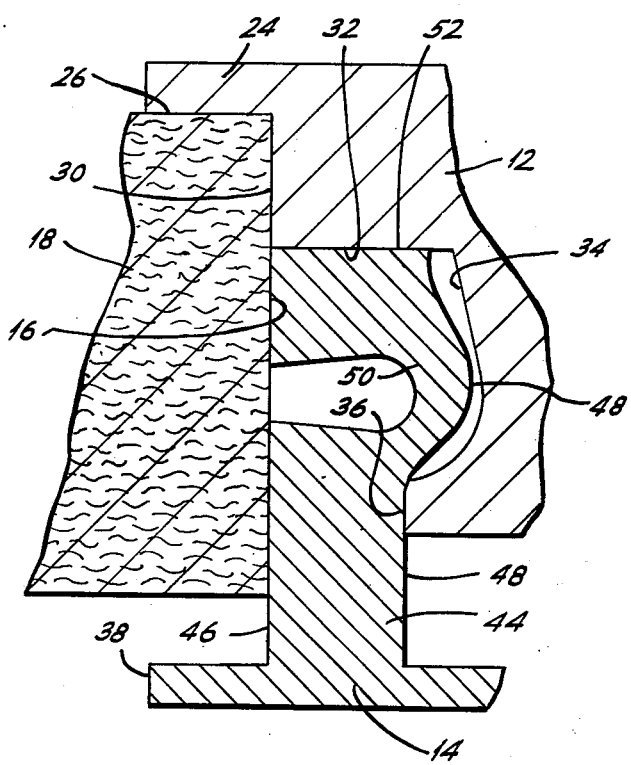
FIG. 2 is an enlarged, partially cutaway view of the grommet assembly of FIG. 1 shown in a partially installed position.
Figure 3:
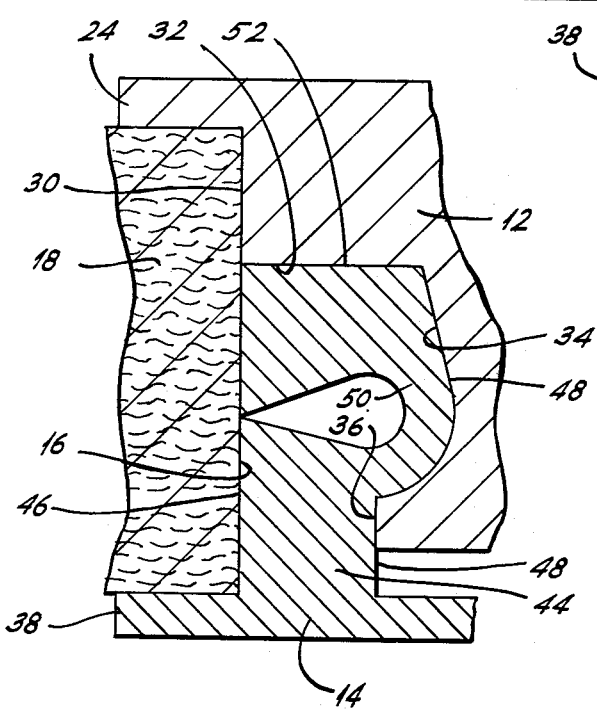
FIG. 3 is an enlarged, partially cutaway view of the grommet of FIG. 1 shown in a fully installed position.

Assembly of the two piece grommet will now be described with reference to FIGS. 1 – 3. Members 12 and 14 are inserted into opening 16 from opposite sides of the workpiece and are forced together until end surface 52 contacts shoulder 32, as shown in FIG. 1. A squeezing tool including anvils 20 and 22 is used to exert opposing forces in a generally axial direction on the respective enlarged heads of the two members. When sufficient force is exerted, shank portion 44 of member 14 begins to collapse at reduced cross-section portion 50 causing the material to deform radially inwardly into recess 34 in member 12, as shown in FIG. 2.

This deformation occurs because the material is restricted from deforming radially outwardly by the surface of hole 16. Portion 50 continues to deform until it fills recess 34, causing members 12 and 14 to be locked together by virtue of the interference between tip portion 36 and the material of shank portion 44, as shown in FIG. 3. In this finally assembled, locked condition, heads 24 and 38 respectively abut the surfaces of workpiece 18 and bores 28 and 42 are in axial alignment (not shown). Surfaces 30 and 46 buttress the workpiece material around opening 16. The assembled grommet can thus be used to attach various kinds of fasteners to a panel skin and in this way to mount a variety of external devices to the workpiece.

Having thus described a preferred embodiment of the present invention, some of the many advantages should now be readily apparent. The novel two piece grommet assembly provides a simple and reliable means for attaching various kinds of fasteners to a panel skin. Once installed the grommet remains locked in place in the hole through which it is inserted. It is particularly useful in advanced composite material panel skins wherein it provides support and reduces localized bearing stress on the periphery of the installation holes, and eliminates corrosion between the panel skin and certain fastener materials.

While in the foregoing there has been disclosed a preferred embodiment of a grommet assembly in accordance with the present invention, various changes and modifications should be readily apparent to one skilled in the art and are within the intended scope of the invention as recited in the claims.

I claim:
1. A grommet assembly comprising:
    a first member including an enlarged head at one end thereof adapted to bear on one surface of a workpiece, a shank portion extending from said head and formed to be inserted into an opening in the workpiece from said one surface thereof, said shank portion including a segment having an outer periphery substantially conforming to the shape of the opening, a tip portion at the other end of said first member having an outer periphery less than the opening, a recessed portion between said shank portion and said tip portion, said recessed portion having at least some part of its outer periphery less than the outer periphery of said tip portion, and a shoulder disposed between the outer periphery of said shank portion and said recessed portion; and
    a second member having an enlarged head at one end thereof adapted to bear on another surface of the workpiece, a shank portion extending from said head and formed to be inserted into the workpiece opening from said another surface thereof, said shank portion having an outer periphery substantially conforming to the shape of the opening and an inner periphery greater than the first member tip portion outer periphery, an end portion at the other end of said second member, and a section of varying reduced thickness intermediate the ends of said second member shank portion varying from a maximum thickness adjacent each of said ends to a minimum thickness intermediate the ends of said reduced thickness section, said reduced thickness section being juxtaposed from and cooperating with said first member recessed portion to provide an interlock therebetween upon the application of opposing forces on said first and second members to form the grommet assembly, said first and second members each having a passageway extending therethrough, said passageways being in substantial alignment with each other when said first and second members are interlocked together.

2. A grommet assembly in accordance with claim 1 wherein said reduced varying thickness section deforms upon the continued application of opposing forces on the first and second members when said second member end portion bears upon said first member shoulder, and material from said reduced thickness section occupies said recessed portion.

3. A joint assembly comprising:
    a workpiece having a first and second surface with a continuous opening therebetween; and
    a grommet assembly including a first member having an enlarged head at one end thereof adapted to bear on said first workpiece surface, a shank portion extending from said head and formed to be inserted into said opening from said first workpiece surface, said shank portion including a segment having an outer periphery substantially conforming to the shape of the opening, a tip portion at the other end of said first member having an outer periphery less than the opening, a recessed portion between said shank portion and said tip portion, said recessed portion having at least some part of its outer periphery less than the outer periphery of said tip portion, and a shoulder disposed between the outer periphery of said shank portion and said recessed portion, and a second member having an enlarged head at one end thereof adapted to bear on said second workpiece surface, a shank portion extending from said head and formed to be inserted into said opening from said second workpiece surface, said shank portion having an outer periphery substantially conforming to the shape of the opening and an inner periphery greater than the first member tip portion outer periphery, an end portion at the other end of said second member, and a section of varying reduced thickness intermediate the ends of said second member shank portion varying from a maximum thickness adjacent each of said ends to a minimum thickness intermediate the ends of said reduced thickness section, said reduced thickness section being juxtaposed from and cooperating with said first member recessed portion to provide an interlock between said first and second members upon the application of opposing forces thereon to form a grommet assembly in the joint, said first and second members each having a passageway extending therethrough, said passageways being in substantial alignment with each other when said first and second members are interlocked together.

4. A joint assembly in accordance with claim 3 wherein said second member varying reduced thickness section deforms upon the continued application of opposing forces on said first and second members when said second member end portion bears upon said first member shoulder, and material from said reduced thickness section occupies said recessed portion.

5. A joint assembly in accordance with claim 3 wherein said workpiece is constructed of an advanced composite material.

6. A joint assembly in accordance with claim 5 wherein the grommet assembly is constructed from a material selected from the group consisting of titanium and MP35.

* * * * *